June 15, 1954  S. H. DAVIS  2,681,137
BELT CLEANING DEVICE
Filed April 14, 1950  2 Sheets-Sheet 1

INVENTOR:
Spencer H. Davis
BY Paul & Paul
ATTORNEYS.

June 15, 1954  S. H. DAVIS  2,681,137
BELT CLEANING DEVICE
Filed April 14, 1950  2 Sheets-Sheet 2
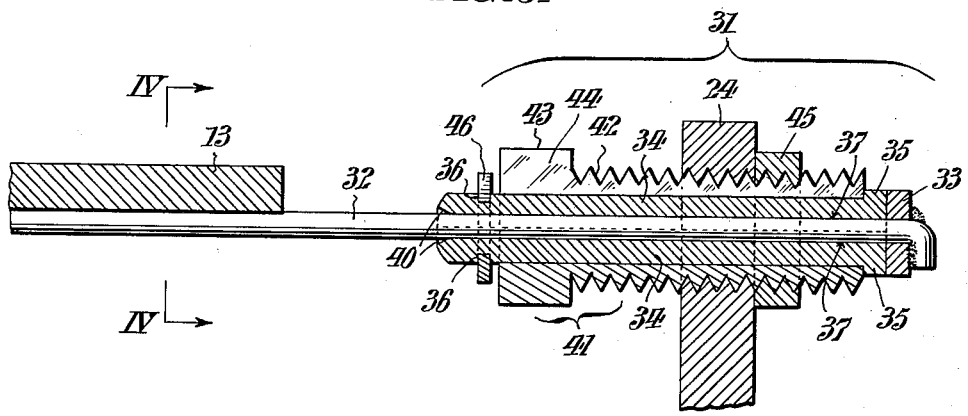
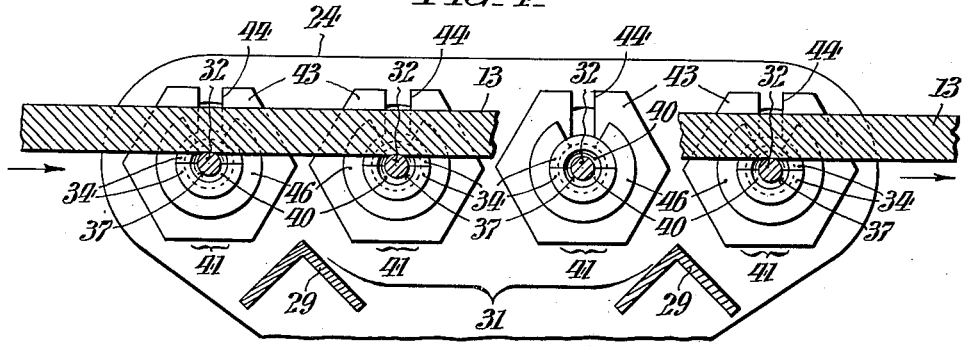
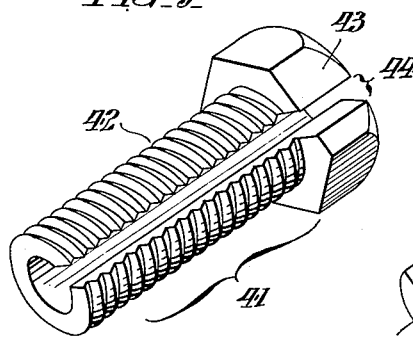
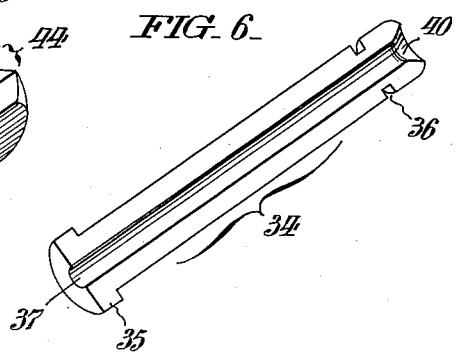
INVENTOR:
Spencer H. Davis
BY Paul & Paul
ATTORNEYS.

Patented June 15, 1954

2,681,137

UNITED STATES PATENT OFFICE 2,681,137

BELT CLEANING DEVICE

Spencer H. Davis, Philadelphia, Pa.

Application April 14, 1950, Serial No. 155,892

12 Claims. (Cl. 198—230)

This invention relates to a device for removing material from the surface of a belt or like object, and further relates to a belt cleaning device having a vibrating element in contact with a belt, and adapted to exert cooperative scraping and vibratory forces in removing material from the belt.

In conventional continuous belt conveyors in which granular material is fed on the top run of a belt and is eventually discharged at a discharge end of the belt, some materials have a tendency to adhere tenaciously to the under surface of the belt on its return run. This tendency is noted particularly when coal, ashes, or like materials are damp. The adherent particles, travelling on the underside of the conveyor belt, have a tendency to build up in ridges on snub pulleys or supporting idlers associated with the return belt and to throw the belt out of alignment. The accumulations of material also cause cross flexing of the belt with resultant early failure. Moreover, the continuous detachment of some of the particles from the under side of the belt creates a troublesome cleaning problem in the plant.

Belt cleaners of the scraper type have been known and used for some years. However the removal of material by belt cleaners of the prior art has been at best incomplete, even though the scraper is urged against the surface of the belt with sufficient force to cause material wear and to shorten the life of the belt.

It is accordingly an object of this invention to remove adherent particles from the surface of an article such as a belt or the like. A further object is to remove material from a moving conveyor belt. Still another object of the invention is to provide a device for removing material from a moving belt without materially wearing the belt. Other objects and advantages of the invention, including those derived from the simplicity and economy of same, will be apparent from the description, as hereinafter set forth, of one preferred embodiment of the invention, having reference to the accompanying drawings.

In summary, the invention comprises a cleaning device for removing material from the surface of an article, comprising a support and a vibrating element yieldingly held by said support against said article.

Of the drawings:

Fig. 3 is a sectional view taken as indicated by the lines and arrows III—III which appear in Figs. 1 and 2.

Fig. 4 is a sectional view taken as indicated by the lines and arrows IV—IV which appear in Figs. 2 and 3, with parts broken away as indicated.

Fig. 5 is a perspective view of a tension bolt comprising an element of the belt cleaner device, and Fig. 6 is a perspective view of a filler piece comprising another element of the belt cleaner device.

Figure 1:
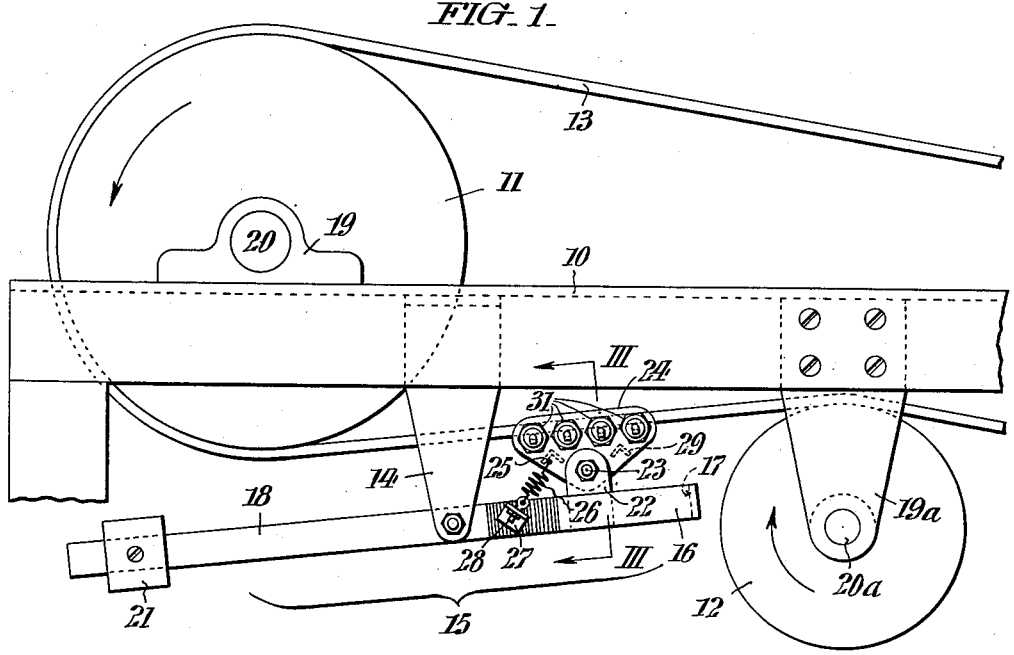
Fig. 1 represents a side elevation of the belt cleaning device associated with the end portion of a conveyor belt structure.
Figure 2:
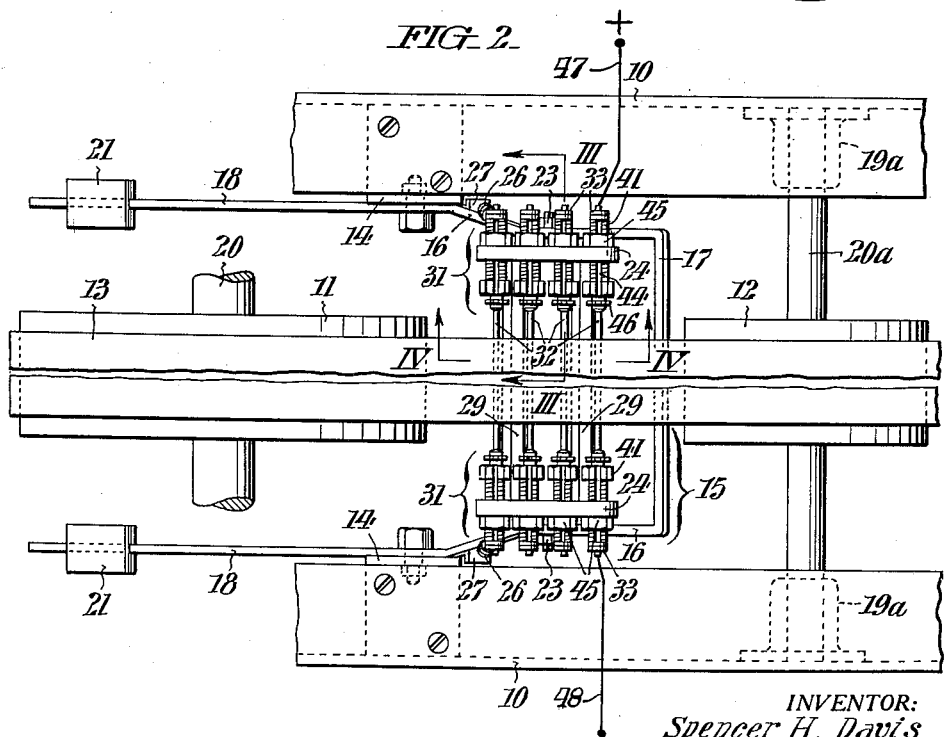
Fig. 2 is a plan view of the same.

With reference more particularly to Figs. 1 and 2 of the drawings, the structure there shown includes support beam 10, conveyor pulley 11, and idler pulley 12 which are rotatably mounted on support beam 10 by means of conventional bearings 19, 19a and shafts 20, 20a respectively. Continuous conveyor belt 13 is trained around conveyor pulley 11, and in contact with idler pulley 12, and is also supported by a conventional driven conveyor pulley, not shown.

Suspended from support beam 10 are hangers 14. Pivotally mounted on hangers 14 is a belt cleaner carriage frame 15 comprising a pair of arms 16 disposed outwardly of the conveyor belt 13, a transverse arm 17, and a pair of lever arms 18. Slidably mounted on each lever arm 18 is an adjustable weight 21. Carriage holders 22 are secured to arms 16 and apertured for the reception of pivots 23 on which carriage pieces 24 are pivotally mounted.

On the side of the carriage pieces 24 toward the source from which conveyor belt 13 moves, is an aperture 25 accommodating spring 26. Arm 16 has an attached angle iron 27 suitably apertured for reception of ringheaded adjustment bolt 28 to which spring 26 is attached.

Carriage pieces 24 are held rigidly together by a pair of transverse angle irons 29. Extending transversely of conveyor belt 13 and held under tension by adjustable wire suspending devices comprehensively designated as 31, are wires 32. The wires 32 are normally in contact with conveyor belt 13 and are preferably made of wear resistant non-corrosive material such as hard drawn stainless steel having a high fatigue point. Other wires having the capacity to vibrate in contact with an object such as a conveyor belt are suitable as well.

An adjustable wire suspending device instrumental in practicing the invention is represented in Figs. 1 and 2, and in some detail in Figs. 3 and 4. Wire 32 has a button 33 affixed to its end as by silver-soldering, for example. A pair of filler pieces 34 are interfitted with wire 32, and are in abutting position relative to button 33. Filler pieces 34 (see also Fig. 6) have flanges 35 at one end and also have peripheral grooves 36 spaced along the shank of filler piece 34 from flange 35. Filler pieces 34 also have longitudinal grooves 37 suitably shaped for snug accommodation of wire 32. Each groove 37 has an outwardly curved end contour terminating in mouth 40.

Threadedly engaged with carriage piece 24 and fitted over a pair of filler pieces 34 is hollow tension bolt 41 or other tubular member (see also Fig. 5). Tension bolt 41 has a hollow threaded shank 42 and a hexagonal head 43 formed integrally therewith. The entire tension bolt 41 has a longitudinal slit 44 permitting the tension bolt 41 to receive a wire 32 therethrough. The shank end of tension bolt 41 abuts flanges 35 of filler pieces 34. Lock nut 45 is threadedly engaged with the tension bolt 41 and is adjacent to the outer surface of carriage piece 24. Spring washer 46 is seated in aligned grooves 36 of filler pieces 34, in board of the tension bolt 41.

In setting up my device for operation, the carriage frame 15 and the carriage pieces 24 are mounted in a conventional manner. The wires 32 are disposed through the respective apertures in the carriage pieces 24 and two filler pieces 34 are placed in surrounding position on each wire 32 with the flanges 35 adjacent buttons 33. Tension bolts 41 are then slid around wires 32 which pass through slots 44, and are slipped over the filler pieces 34. Tension bolts 41 are then threadedly engaged with the corresponding carriage piece 24 by turning tension bolt 41 about its axis. Further turning of tension bolt 41 brings its end against flanges 35 of filler pieces 34 thereby increasing the tension on wire 32. The filler pieces 34 provide means for tensioning the wires 32 without turning them under the influence of tension bolts 41, thus relieving twist strains in the wires 32. After the desired degrees of tension on the individual wires 32 are attained, lock nuts 45 are drawn up against carriage pieces 24 thereby preserving the desired frequency of vibration of each wire. Spring washers 46 are then snapped into place in grooves 36, thereby holding the entire wire suspending assembly together even in the event of wire breakage.

The adjustable weights 21 are suitably positioned on lever arms 18 to urge the wires 32 with the desired degree of force against the under side of conveyor belt 13. The drag effect of belt 13 on wires 32 tends to rotate carriage pieces 24 about pivots 23. Such rotation is opposed by spring 26 which holds the wires 32 substantially parallel to the lower surface of belt 13.

The scraping or rubbing action of the belt on the wires sets up a natural vibration in the wires, and this vibration in turn loosens and removes particles from the belt. By reason of the combined scraping and vibratory action of a tensioned wire, superior belt cleaning results are attained.

The particles removed from the belt fall through the grid of wires 32 and angle irons 29 and may be collected in a chute or in a container of the desired type. While in some cases it is preferred to mingle the recovered material with the main charge, the recovered material often consists largely of relatively fine particles and separate handling and eventual use may be indicated.

Optimum results with a single-wire device are attained by adjusting the tension of the wire to produce the optimum frequency of vibration. Still preferable results are attained by providing a vibrating wire belt cleaner having a plurality of independently adjustable tensioning devices. By varying the degrees of tension of the individual wires, particles of different sizes are removed more completely from the belt. Preferably, the leading wire, or the wire first to contact the material to be removed, is under relatively low tension, and the secondary wires, or the wires which contact the material left on the belt by a previous wire, are under successively higher tensions.

The vibrating element of the belt cleaning device may be a wire or other vibrating scraper having a circular, oval, rectangular, or other cross section and may vary in size between any desired limits. For example, a wear resistant wire having a principal cross sectional dimension of $\frac{1}{16}$ to $\frac{1}{8}$ inch has been found well adapted to exert coacting vibrating and scraping actions on 36-inch belts, and remains in service for a considerable time before failing. Moreover, a vibrating wire is well suited to remove material from a conveyor belt having a curved or other complex belt surface. For example some conveyors have crowned pulleys which fold the belt into a V-shape and such belts may be cleaned by the vibrating wire scraper of this invention, particularly when the wire is held under relatively low tension.

For removal of frozen or congealed particles such as ice, sulfur or other materials, the vibrating element may be heated electrically. This is readily accomplished by insulating the wires 32 from the supporting structure, as by making the filler pieces 34 of electric insulating material, and connecting the wires 32 through electric wires 47, 48 to a regulated electric source for heating. The heated wire exerts cooperative scraping, vibrating and softening actions on the material to be removed.

It will be observed that I have shown a supporting and tensioning assembly for the vibrating element at each end of the carriage frame 15. It is obvious that a tensioning device at one end would suffice to provide effective cleaning in accordance with my invention. However, by providing a duplicate assembly at each end, worn out wires 32 may be readily and conveniently replaced with a minimum of outage time.

It is desirable in practicing the invention to urge the vibrating wires against the belt under a relatively light pressure. While I have shown a weighted lever device for applying such light pressure, it will be appreciated that equivalent structures, such as adjustable spring devices or the like, for example an adjustable helical spring attached between the end of arm 17 and an adjacent point on the beam 10, may be substituted therefor without departing from the scope of the invention In order to eliminate the likelihood of resonant conditions being set up between possible weaving or bouncing movements of the belt 13 and the natural oscillatory period of the carriage 15, which might cause the cleaning elements to skip or lose cleaning contact with the belt, it may under certain conditions be desirable to provide a conventional dash pot or shock absorber between the arms 16 or 18 and suitable adjacent parts of beam 10 or hanger 14.

While I have described in detail one embodiment of a belt cleaning device of the invention, it will be apparent that numerous changes may be made in the form of the device, including particularly the manner in which it may be mounted and disposed against the belt and the manner in which the vibrating element may be suspended. It will also be apparent that various reversals of parts and substitutions of equivalent mechanisms may be made, and that certain features of the invention may at times be used with or without the use of other features, all within the spirit of the invention as defined in the annexed claims.

Having thus described my invention, I claim:

1. A belt cleaner comprising a support having spaced wire-holders, a wire held under tension by said wire-holders and disposed transversely of said belt, means for varying the tension of said wire, and yieldable means for urging said wire against said belt, said wire having capacity to vibrate relative to said wire-holders under the influence of said belt.

2. In a cleaner for removing material from a belt, a support, a plurality of vibrating elements held under tension on said support, and means for holding said vibrating elements in contact with said belt, said vibrating elements being under unequal tensions.

3. A belt cleaner for removing material from a continuously advancing belt, comprising a support, a leading wire mounted under tension on said support for contact with said belt, and a secondary wire also mounted under tension on said support for contact with each portion of the belt subsequent to the contact of the leading wire with said portion, said secondary wire having a tension higher than the tension of said leading wire.

4. A belt cleaner comprising a supporting framework, mounting means on said framework, a wire mounted on said mounting means, and means for contacting said wire with said belt, said mounting means including a hollow bolt threadedly engaged with said framework, said hollow bolt having a lengthwise slit for accommodation of said wire, filler pieces positioned in said hollow bolt having peripheral grooves beyond one end of said hollow bolt and having end flanges abutting the other end of said hollow bolt, a spring washer in said peripheral grooves, and a button on the wire abutting the flanges of said filler piece, whereby the tension of the wire may be varied and controlled by turning said hollow bolt.

5. In apparatus for removing adherent particles from a belt having revolving belt supporting means and a free run of said belt adjacent said belt supporting means, mechanical belt cleaning apparatus comprising a support, wire holding means on said support, a wire mounted under tension on said wire holding means, and yieldable means urging said wire against said belt, said wire being removed a substantial distance from the vicinity of said revolving belt supporting means and in rubbing contact with said free run of belt, and said wire being effective to remove said particles by combined scraping and vibratory action, said wire having capacity to vibrate relative to said wire holding means and said belt.

6. In combination with a continuous moving conveyor belt trained around a revolving belt supportinig element, said belt having an upwardly facing working run conveying toward and over said element material of fine particle size having a tendency to adhere to the belt, and said belt having a downwardly facing free return run leaving said element, a mechanical cleaner for removing said fine particles from said return run comprising a frame, wire holders carried by said frame, a wire under tension extending intermediate said wire holders transversely of said belt, and yieldable means continuously urging said wire upwardly against said return run of the belt for contact with the belt along a line removed from said revolving belt supporting element, the rubbing action of the free run of belt on the wire inducing vibration of the wire relative to said wire holders and relative to said belt, causing it to clean fine particles from the belt by simultaneous coacting scraping and vibratory actions.

7. In combination, a belt, a carriage mounted adjacent said belt, a wire under tension on said carriage, means for urging the wire against said belt, and electric means for heating said wire.

8. In combination, a belt, opposed support elements mounted adjacent said belt, a wire holder in the form of flanged filler pieces of electric insulating material supported by said support, mechanical means for securing said wire holder relative to said support, a belt scraper in the form of a wire engaged by said wire holder and suspended under tension intermediate said support elements, yieldable means for urging said wire against said belt, and electric conductors connected to a source of electric energy and through said wire to raise its temperature 9. In combination with a belt, a support, a wire under tension mounted on said support, means for urging said wire against said belt, detachable wire mounting means including a detachable tubular member surrounding the wire, said tubular member having a longitudinal slit of sufficient size to accommodate the wire to permit removal of the tubular member from the support independently of the wire, means for engaging the detachable mounting means with the wire, and means for engaging the detachable mounting means with said support.

10. A mechanical belt cleaner comprising support elements spaced from one another, a wire, means for fixing said wire to one of said support elements, detachable filler pieces shaped to conform to said wire, means for engaging said filler pieces upon said wire, a tubular member having a hollow space of sufficient size to accommodate said filler pieces and also having a slit throughout its length providing an opening accommodating said wire alone, the size of said opening being insufficient to accommodate said wire together with said filler pieces, and means for engaging said tubular member with the other of said support elements.

11. In apparatus for suspending an elongate element between a pair of spaced-apart supports, means for attaching said element to one of said supports, a plurality of filler pieces shaped to conform to said elongate element, a tubular member having a hollow space of sufficient size to accommodate said filler pieces and also having a slit throughout its length, said slit being of sufficient width to accommodate said elongate element, and mechanical means for attaching the tubular member to the other of said supports.

12. The belt cleaner defined in claim 1 wherein a plurality of wires and tension varying means are provided, said tension varying means having capacity for independent regulation of different wire tensions.

References Cited in the file of this patent

UNITED STATES PATENTS

| Number | Name | Date |
|---|---|---|
| 1,539,515 | Samuelson | May 26, 1925 |
| 1,720,609 | Rondolin | July 9, 1929 |
| 1,772,584 | Peiler | Aug. 12, 1930 |
| 1,950,317 | Luneburg | Mar. 6, 1934 |
| 2,514,780 | McGovern | July 11, 1950 |

FOREIGN PATENTS

| Number | Country | Date |
|---|---|---|
| 421,816 | Germany | Nov. 20, 1925 |